April 24, 1956 R. W. CLAUSS 2,742,889

FLAT BODIED POJECTILES AND MEANS FOR DIRECTIONALLY CONTROLLED PROJECTION THEREOF

Filed Oct. 9, 1950 3 Sheets-Sheet 1

INVENTOR.
Robert W. Clauss
BY C. P. Goepel
his ATTORNEY

INVENTOR.
Robert W. Clauss
BY C. P. Goepel
his ATTORNEY

INVENTOR.
Robert W. Clauss
BY C. P. Goepel
his ATTORNEY

United States Patent Office 2,742,889

Patented Apr. 24, 1956

2,742,889

FLAT BODIED PROJECTILES AND MEANS FOR DIRECTIONALLY CONTROLLED PROJECTION THEREOF

Robert W. Clauss, New York, N. Y.

Application October 9, 1950, Serial No. 189,248

1 Claim. (Cl. 124—26)

The invention relates to relatively flat bodied projectiles and, while related to the type of disk projectile used on a Toy Pistol for Distributing Advertising Projectiles disclosed in U. S. Letters Patent 2,019,894, has application to munition projectile uses.

The object and purpose of this invention is to provide a means for the accurate directional control of such flat bodied projectiles when projected from a catapult, a gun, or the like. A control of the release of the projectile from the impeller is provided, so that the projectile trajects in the direction of the centrifugal force at the time when the same is released from the impeller.

The novel structure of my invention includes a projectile in which the position of the point of application of the impeller force retains a specific place in relation to the center of gravity of the projectile, in order to control the forces applied to the projectile in the generation of its movement at the moment of release of the projectile from the impeller, so that these forces cause and control the flight of the projectile in a desired direction. In other words, there is created in the projectile an energy resulting from controlled co-acting forces, so that the projectile can be released from the impeller at the predetermined direction of the centrifugal force at the moment of the release of the projectile from the impeller. Mere straight line impeller action given to the projectile gives no distance to the throw. Mere rotation of the projectile gives no predetermined flight direction. When these two forces are out of control as by one being stronger than the other, at the time of the release of the projectile from the impeller, there is a useless loss of energy. The combination of both forces under certain definite controlled conditions gives both flight direction in the line of sight of the gun and greatest distance. Subordinate to this, the angle of flight direction of the projectile, departing from the sight direction of the gun, may be predetermined and utilized.

The invention will be further described hereinafter, embodiments thereof shown in the drawings, and the invention will be finally pointed out in the appended claim.

In the accompanying drawings,

Figs. 4 and 5 show a straight line impeller force, as in Figs. 1 to 3;

Figs. 7 and 8 show diagrammatically a straight line forward projection, in line with a straight line impeller path, and with the impeller and centrifugal forces in balance;

Figs. 9 and 10 show diagrammatically a projection inclined to the line of sight;

Figs. 11 and 12 show diagrams similar to those of Figs. 9 and 10, with projections in opposite direction, in which there is an overshot, and the projectile at an angle to the line of sight;

Similar characters of reference indicate corresponding parts throughout the drawings.

Figures 1, 2, 3, 4:
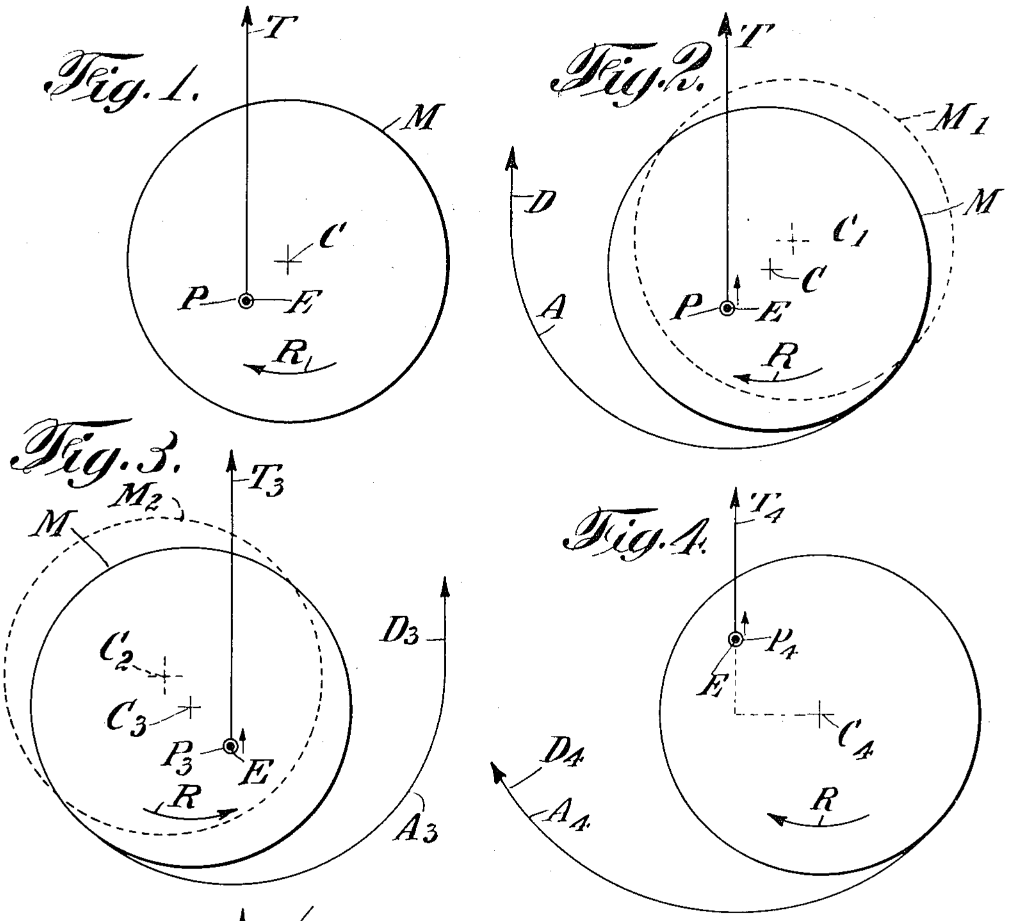
Fig. 1 shows a missile or projectile having an impeller opening in the rear and at the left side of the center of gravity of the projectile in order to achieve a controlled balanced impeller thrust and centrifugal force relationship at the time of the release, with the projectile, when in flight, remaining in line with the sight of the gun.
Fig. 2 shows the same projectile with the same relationship between the center of gravity and the impeller opening, but diagrammatically showing certain indications of movements.
Fig. 3 shows the same projectile of Figs. 1 and 2, but with the impeller opening disposed at the right and in the rear of the center of gravity, and also showing certain indications of movements.
Fig. 4 shows the projectile with the impeller opening at the left of and in front of the center of gravity, and indicating the direction of the projection, which deviates from the line of sight.
Figures 7, 8, 9, 10, 11, 12:
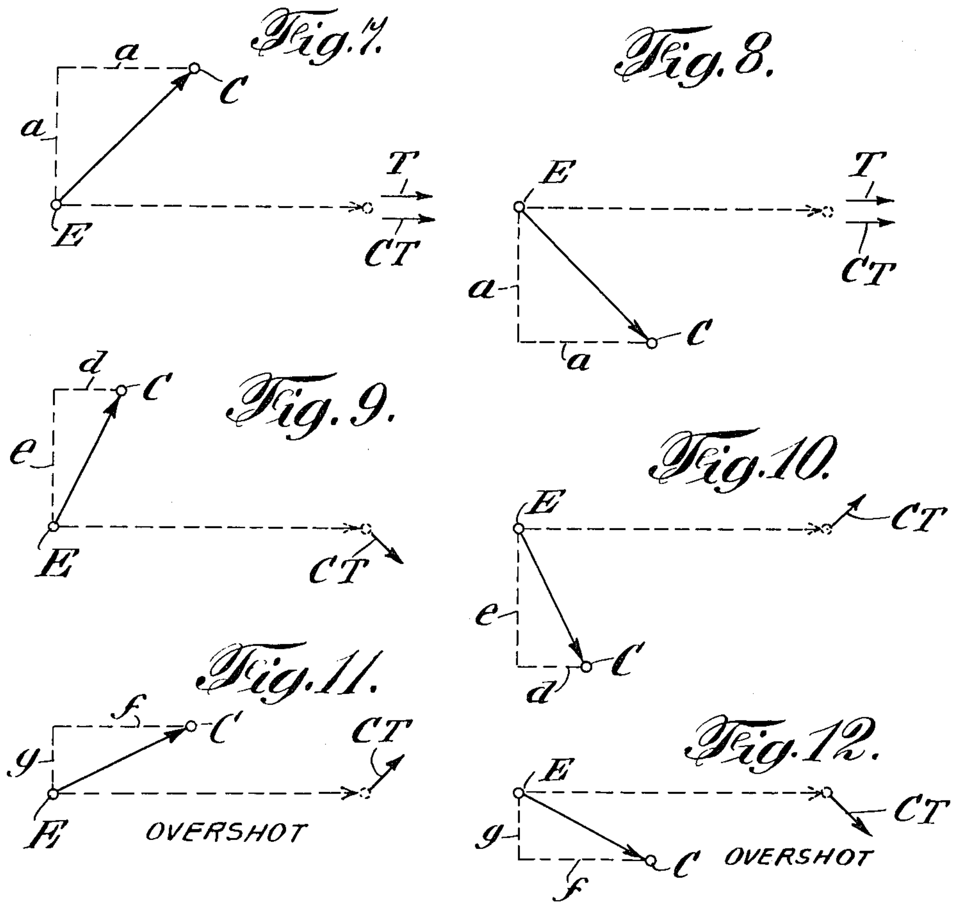
Figs. 7 to 12 show a projectile with the center of gravity in advance of the point of application of the impeller action.

Referring to the drawings and more particularly to Figs. 1 and 2, the projectile is first pushed forward by the impeller slightly before rotating the projectile, and is rotated after overcoming the inertia of the projectile. This is accomplished by placing the impeller hole P to the left side of the center of gravity C and to the rear of the center C. The projection path D (see Fig. 2) is in the same straight line forward direction as the direction of the impeller. The impeller force and the centrifugal force are in balance (Fig. 8, where "*a*" equals "*a*").

In Fig. 3, the impeller point $P_3$ is shown at the right side and to the rear of the center $C_3$, with the path $A_3$ merging in the direction $D_3$, parallel with the impeller direction $T_3$, the missile or projectile M being shown in dotted lines at $M_2$ while moved by the impeller before beginning its rotation. The forces are again in balance, "*a*" being equal to "*a*" (Fig. 7).

At the time of the release of the impeller, the direction of the centrifugal force in the projectile is aligned with the direction of sight.

In Fig. 4, the impeller opening $P_4$ is disposed at the left side and in front instead of at the rear of the center of gravity $C_4$. The impeller direction is shown by $T_4$. The centrifugal force of the projectile whose periphery rotates along arc $A_4$ acts in the direction $D_4$, i. e., to the left of the straight line impeller direction $T_4$. The projectile has been released at a point where the centrifugal force controls its direction of movement.

Figures 5, 6:
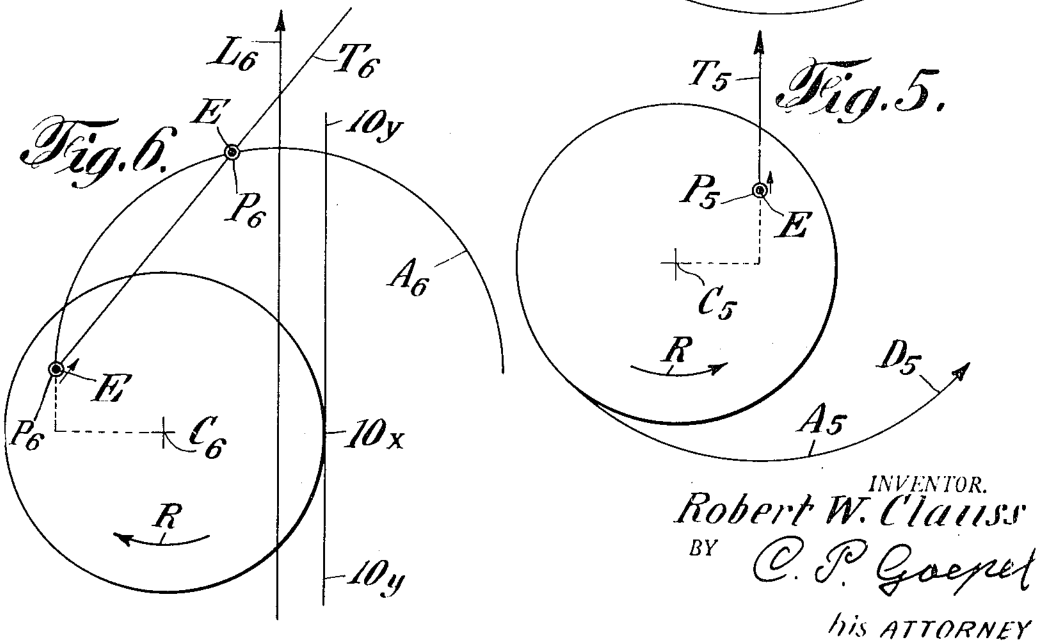
Fig. 5 shows the impeller opening of the projectile at the right of and in front of the center of gravity, and indicating that the direction of the projectile is other than a straight forward line.
Fig. 6 is an explanatory diagram of a projectile acting under an impeller moving in a circular path, this being specially applicable to a toy pistol.

In Fig. 5, the impeller opening $P_5$ is to the right and in advance of the center $C_5$. The projectile moving along the arc $A_5$ travels in the direction $D_5$, i. e., to the right of the straight line impeller thrust $T_5$.

In all figures, E indicates the impeller ejector, and arrow R shows the direction of rotation of the projectile.

In the preferred embodiment like that of Fig. 3, the action of the impeller will first move the projectile forward and the center $C_3$ will move into position $C_2$ where-upon the projectile will pivot around the impelling pin E in the hole $P_3$ at accelerated pace so that the centrifugal thrust of the projectile will align itself with the impelling force at the point of release, and in the line of sight of the gun. This equilibrium or balance of forces causes the projectile to travel along the line of projection $D_3$, and in the same direction as force $T_3$. The line of sight, which is in line with the direction of the impeller thrust, is followed by the projectile. The movement of the projectile is free, that is, it does not abut against anything before and while it is rotated.

In Figures 4 and 5, wherein the line of sight is in the same direction as the direction of the impeller thrust, the flight direction is in the straight line direction of $D_4$ and $D_5$, as shown, and to the left or to the right of the line of sight. In Fig. 4, the straight line impeller thrust is $T_4$, the projectile hole is $P_4$, the center of gravity is $C_4$, the arc of movement of the projectile is $A_4$, and the direction of flight is $D_4$. In Fig. 5, the straight line thrust is $T_5$, the projectile hole is $P_5$, the center is $C_5$, the arc showing the peripheral movement of the attached projectile is $A_5$, and the direction of flight is $D_5$.

In Fig. 6, a circularly moving impeller is utilized instead of a straight line impeller. The projectile has a center of gravity $C_6$, and an impeller hole $P_6$ engaged by the impeller E (the lower positions of $P_6$ and E being referred to). The projectile rests at 10$x$ established by a line 10$y$. The circular movement of the impeller is shown by the arc $A_6$. The impeller E and the hole $P_6$ are in the upper position on the arc $A_6$ when the impeller E disengages itself from the hole $P_6$. The line of sight is shown by $L_6$. With the projectile in the position shown, i. e., against 10$x$, and the impeller E in the hole $P_6$ (lower position), and the diameter of the projectile in relation to the center and hole as shown in Fig. 6 (lower position) all in the relationship shown, the discharge of the projectile, when disengaged from the impeller E (upper position), will be along line $L_6$, the line of sight of the gun. Any change in the relationship of the parts shown in Fig. 6, will set up different resulting actions and results. When it is desired to project a projectile accurately to the left of the line of thrust, as seen in Fig. 6, one must have the unbalanced centrifugal and impeller thrusts under definite unbalanced control, by having the mass, the leverage, and the positioning of the projectile uniform, or so related that the desired centrifugal timing will remain constant.

The rotation of the projectile is accomplished by the pivoting of the projectile around its co-acting impeller at the place of connection. Pivot action is accomplished because the impelling member engages the projectile away from its center of gravity. When the projectile pivots around its impeller, prior to its release, an accelerated centrifugal thrust and an accelerated impeller thrust accumulates in the projectile. When the accumulated centrifugal thrust is so timed as to align itself with the impeller thrust at the moment the projectile is released by its impeller, the direction of projectile flight will be in the direction of the impeller thrust achieving projection efficiency. The projectile is released when the centrifugal force rotating the projectile discharges the projectile in the line of sight of the gun. In all embodiments, the impeller forces are converted into the centrifugal force of predetermined directions at the point and time of release, all factors being adjusted to bring this about. This co-action is called "balanced projection rotation," because the projection thrust and the centrifugal rotation thrust are in timed relation or in balance. The projectile is released by its impeller, when the centrifugal thrust at the time of release is in a desired direction, since any change in direction is arrested by the centrifugal thrust seeking the center of gravity of the projectile during its flight.

Upon the release of the projectile, by its impeller, the centrifugal thrust is converted into flight direction and the rotation establishes itself around the center of gravity of the projectile. The location of the impeller hole in relation to the center of gravity of the projectile (centroid), the mass of the projectile pivoting around the impeller, and the distance of the center of gravity of the projectile in relation to the point of application of the thrust action of the impeller, must all co-act in a given way as explained.

To put a hole in a projectile near its perimeter and to give a projectile a rapid rotary motion in no way establishes directional control of flat bodied projectile disks. Changing the location of the impeller hole in the projectile changes the leverages and the radius in the centrifugal force formula. The only formula for a straight line impeller action, that remains constant for a balanced projection, is found in Figs. 7 and 8 where "$a$" and "$a$" always remain equal, regardless of the location of the impeller holes.

Figure 13:
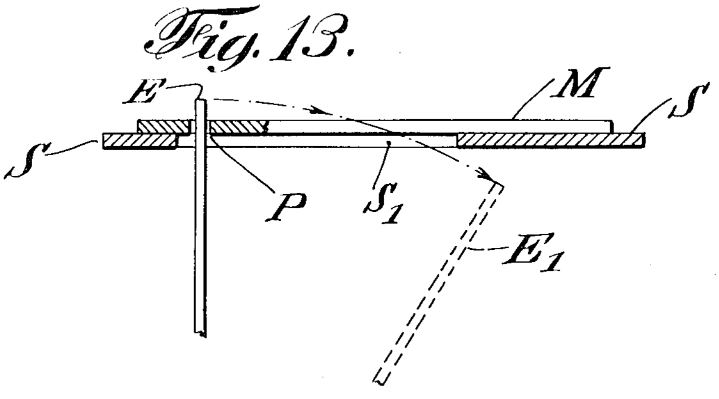
Fig. 13 is a diagram showing the action of the ejector impeller while engaging and after release of the projectile.

It is believed that the rule for the balanced impeller and rotation thrusts, when a projectile is not coerced by an obstruction so as to obtain a more rapid centrifugal rotation from the thrust action of the impelling member and without loss of energy caused by such resistance, and relying on the overcoming of the inertia of the projectile, is the following:

A projectile having an opening for the snug fit of a straight line ejector or impeller E is placed upon a plate S (see Fig. 13), which has a slot $S_1$ for the movement of the impeller or ejector E. When the ejector E is in its initial position, as shown in Fig. 13, it protrudes above the projectile M. When it has reached its position $E_1$, it is free from the projectile M (Fig. 13). These relations are important, since a change therein constitutes one of the variable factors. The projectile is placed upon the plate S, with its center of gravity C ahead of the ejector E (Fig. 7), the ejector E passing through the no lost motion opening P in the projectile, and the center C moved to a position as shown in Fig. 7. This may be described as the formation of a right angled isosceles triangle. By drawing a line through the center C, parallel with the line of thrust of the impeller or ejector E, and projecting the initial position of the ejector E upon that line, the center C should be placed in that position where side "$a$" along the center line is equal to side "$a$" of the line on which said projection was made. This need not be mathematically accurate and slight variations will still give satisfactory results for toys to project the disk forward in a straight line in continuation of the impeller thrust line, but it is important for calculated munition trajections. The impeller line is indicated in Fig. 7 by arrow T, and the centrifugal force thrust by arrow CT, and these are parallel or coincident (Figs. 7 and 8).

If the side $d$ of the triangle is made smaller than side $e$, the direction of the disk on ejection will be shown by the centrifugal thrust arrow CT in the direction shown, which shows how to select a direction to the right, the centrifugal force being in this case greater than the impelling force and delayed or out of alignment with the impelling force, on the beginning of the projection (Figs. 9 and 10).

If the side $f$ of the triangle is made longer than the side $g$ (Figs. 11 and 12), then the centrifugal thrust, as shown by the arrows CT, has been advanced beyond the impelling force direction or out of alignment.

The diagrams of Figs. 9 to 12 show a release of the projectile when the centrifugal force acts in the indicated direction to the left or right of the impeller action.

With the center of gravity of the projectile in advance of the impeller hole P snugly engaged by the ejector or escapement E, the direction may be determined straight away, to the left or to the right. When the centrifugal and impeller forces are in balance at the time of the release of the disk from the escapement E, the travel under centrifugal or gyroscopic forces is greatest (Figs. 7 and 8). As shown by the hypothenuses of the triangles, thrust from the impeller ejector E is given to the center of gravity C of the disk or projectile to start its rotation. The kinetic energy applied to the projectile at the point of its release determines the continuance of the flight.

One practical application of this invention is to make the projectiles in the form of a flat disk for toy pistols; another application is to have the projectiles in the form of a lentil shaped container, having an impeller opening with a snug fit for the impeller. This may be filled with any kind of suitable explosive and shrapnel, with or without time or contact fuses, or with or without an illuminant. The projectile has a noiseless flight and detection of its origin is not readily possible, because the gun has no flame discharge. A feeding chute 20 (Fig. 14) is suitably supported, and the operation of a finger 21 releases the lowest lentil or tear drop shaped projectile 22.

The impeller opening of the disk is placed in the chute directly above the impeller end 23, and the disk drops into the proper position on the plate S. A spring tension member 24 is secured at its lower end 25 to a board or frame 26, which forms one leg of a three leg stay, the other legs 27 being shown in the view as coincident. A handle 28 is secured to the member 24 and a snapper holds the member 24 against the member 26. The release of the snapper 29 causes the spring tension in the member 24 to snap the impeller 23 to its projectile release position, as shown in the dotted lines. This semi-automatic flying disk propeller can be readily operated by two hands, one to secure and release the impeller, and the other to release the next projectile. The return of the impeller can be achieved by hand or by mechanical devices.

Figures 14, 15:
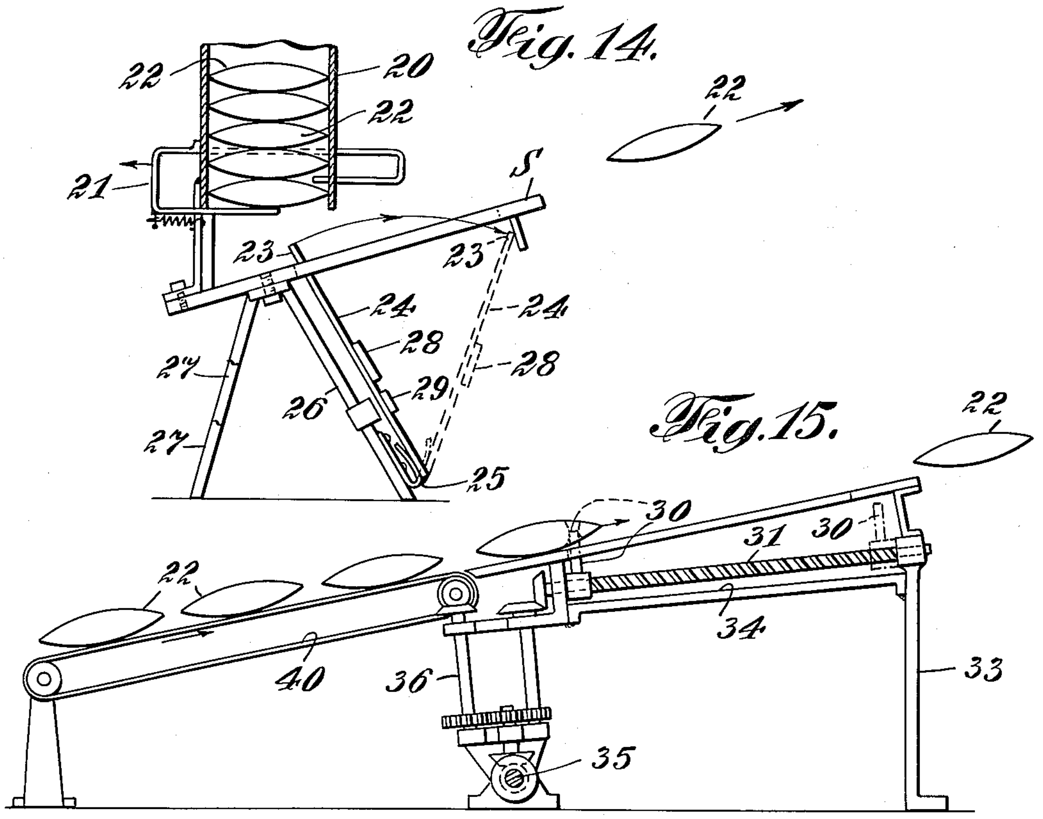
Fig. 14 is a diagrammatic view showing the application of the invention to a gun mechanism impeller.
Fig. 15 is a diagrammatic view showing the application of the invention to a battery of such impellers.
Figure 16:
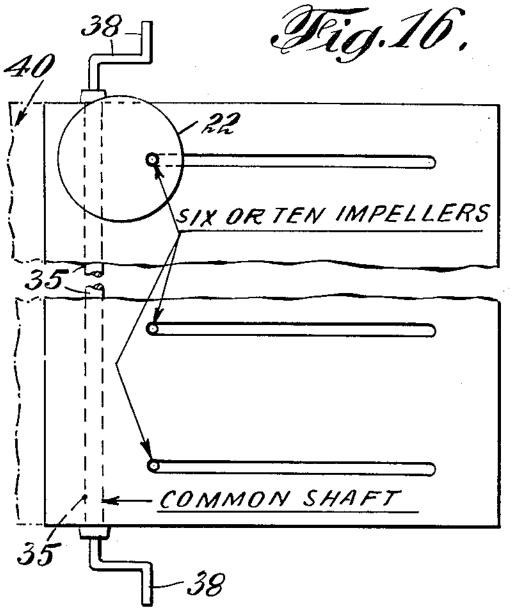
Fig. 16 is a diagrammatic plan view of Fig. 15.

An automatic device is shown in Fig. 15. A battery of three, six, ten, or more projectiles have the impeller devices placed next to each other. The impeller 30 is operated by an accelerating speed screw 31 until the impeller is in release position. A leg 33 supports the plate 34 supporting the spindle 31. The spindle 31 is driven by suitable worms and gears from a main shaft 35, which extends under the entire battery of projectile supporting plates and impellers, and by such gearings operates each spindle 31. The projectiles 22 may be supplied by the chute 20, as shown in Fig. 14, or by an apron 40, which is operated by gears and shafts 36 from the main shaft 35. An electric motor, where electric power is accessible, or any other motor means, may be used to operate the common shaft 35, or a handle 38 at each end of the shaft 35 can be turned to in turn actuate the spindles 31, whereby one or two attendants can operate a flying disk projectile multi-impeller.

Figure 17:
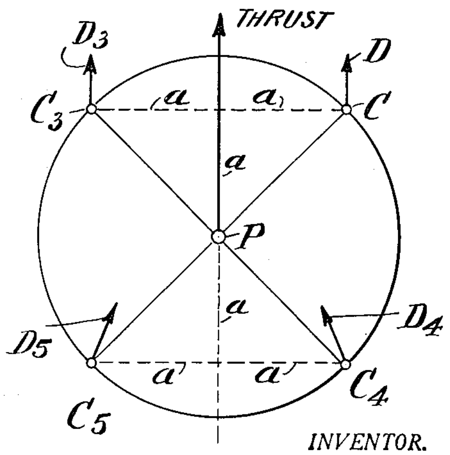
Fig. 17 is a plan view of a gunner's chart.

Fig. 17 shows a gunner's chart which may be placed on the plate traversed by the impeller. The references applied thereto correspond with the corresponding figures. The circle shown in Fig. 17 is not the perimeter of a projectile or disk, but locates the respective positions of the center of gravity of a projectile in respect to the center of that direction finding circle which represents the impeller where it engages the projectile. Thus the projectile can be placed in any of its positions, and its flight direction assured in advance. It should be particularly noted that the projectile is not obstructed in any way on the plate, save only held by the impeller, and hence no loss of energy results on account of obstruction resistance.

From the foregoing, it is clear that the following objects have been attained:

The invention provides a more economical type of projectile disk for toy pistols eliminating the reinforcement of the projectile engagement holes, by the hole making a snug fit with the end of the impeller.

The invention provides a balanced projected rotation so as to obtain the maximum projection efficiency from the impelling force, and enable the projectile to travel along the line of projection without loss of energy, when projected, and along a predetermined line of sight.

The invention provides a new non-deviational combination of actions between impelling thrust action, position of the impelling hole and the position of the center of gravity of the projectile for the directional control of rotating substantially flat-bodied projectiles.

The invention provides a projectile capable of different flights in the left and right hand directions by the relationship of the impeller hole to the center of gravity.

Since it is desirable to have the missiles always travel along the line of sight, the rotation of the projectile must co-act in a specific way with its impelling action. A desired mass co-action is accomplished by the location of the impeller receiving hole in the projectile. To eliminate any deviation from such co-action, the impeller hole in the projectile must be of the same size as the projecting pin of the impelling member. This snug combination of the pin and hole eliminates the need of any reinforcement of the projectile with material harder than itself, and assures the direction of flight by preventing any deviation from co-action with the impeller mechanism, and avoids lost motion, which may change the relationship of the controlling factors.

I have shown a simple form of impeller, but mechanism to impel with a lash to the impeller can be provided particularly in such cases, where larger lentil shaped projectiles filled with explosive are intended to be used. The shape of the lentil shaped projectiles is determined by aerodynamic principles.

It is believed that the energy used to propel a disk under centrifugal and impelling forces is converted to better advantage than a rifled projectile moving forward under rotation, since the centrifugal force causes a gyroscopic effect and the projectile of planular form is better for passing through the air as it is sustained by the air.

The circular projectile may be provided with a stud projection rather than a hole. Also, the perimeter may be saw toothed to cut into armament. The trajector may also be single, so that a soldier can carry it on his shoulder as part of his equipment, and impel disks, instead of throwing grenades. One or both sides of the projectile may be provided with an anti friction material, to reduce the contact friction with the plate to a minimum.

I wish it to be understood that I do not desire to be limited to the exact details of construction shown and described, for obvious modifications will occur to a person skilled in the art, but only by the scope of the appended claim.

I claim:

In a catapult device for the accurate directional control of rotating substantially flat bodied missiles, the combination of a support, an impeller mounted on said support for movement substantially in the line of sight of said catapult device from its charged position to its idle position, means imparting a predetermined thrust to said impeller for said movement, a substantially flat bodied missile having an axis of rotation perpendicular to the general plane of said missile and having a predetermined weight in relation to said impeller force, and said missile having an opening providing a snug fit with said impeller at a point at a predetermined distance from the center of gravity of said missile to provide an active mass, and indicator means between said support and said missile, said indicator means having an opening for movement of said impeller substantially in the line of sight of said catapult device and markings indicating different positions of the center of gravity of said missile, any one of said center of gravity markings being at all times at an angle relative to said line of sight, whereby, by positioning the center of gravity of said missile onto a selected one of said center of gravity markings and establishing a snugly fitting connection at said opening of said missile between said impeller and said missile, and upon transposing said thrust of said impeller upon said active mass, said missile is adapted to traject from said support in a predetermined direction under the force created by the forward movement of the impeller, the centrifugal force created by the rotation of said missile around said impeller connection, and the rotation of said missile around its center of gravity.

References Cited in the file of this patent

UNITED STATES PATENTS

| | | |
|---|---|---|
| 756,988 | Smith | Apr. 12, 1904 |
| 1,034,943 | Wohlauer | Aug. 6, 1912 |
| 1,608,043 | Smith | Nov. 23, 1926 |
| 2,019,894 | Clauss | Nov. 5, 1935 |
| 2,238,713 | Waring | Apr. 15, 1941 |
| 2,490,031 | Core | Dec. 6, 1949 |